(12) United States Patent
Sak et al.

(10) Patent No.: US 9,818,410 B2
(45) Date of Patent: *Nov. 14, 2017

(54) SPEECH RECOGNITION WITH ACOUSTIC MODELS

(71) Applicant: Google Inc., Mountain View, CA (US)

(72) Inventors: Hasim Sak, New York, NY (US); Andrew W. Senior, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,315

(22) Filed: Dec. 29, 2015

(65) Prior Publication Data

US 2016/0372119 A1 Dec. 22, 2016

Related U.S. Application Data

(60) Provisional application No. 62/182,385, filed on Jun. 19, 2015.

(51) Int. Cl.
*G10L 15/00* (2013.01)
*G10L 17/00* (2013.01)
(Continued)

(52) U.S. Cl.
CPC .............. *G10L 17/14* (2013.01); *G10L 15/02* (2013.01); *G10L 15/16* (2013.01); *G10L 2015/025* (2013.01)

(58) Field of Classification Search
CPC ......... G10L 15/08; G10L 15/02; G10L 15/01; G10L 15/063; G10L 2015/025;
(Continued)

(56) References Cited

U.S. PATENT DOCUMENTS 5,481,644 A * 1/1996 Inazumi .................. G10L 15/16
704/232
5,749,066 A * 5/1998 Nussbaum ............ G10L 15/063
704/232
(Continued)

OTHER PUBLICATIONS

P. Schwarz, P. Matejka and J. Cernocky, "Hierarchical Structures of Neural Networks for Phoneme Recognition," 2006 IEEE International Conference on Acoustics Speech and Signal Processing Proceedings, Toulouse, 2006, pp. I-I.*
(Continued)

*Primary Examiner* — Edgar Guerra-Erazo
(74) *Attorney, Agent, or Firm* — Fish & Richardson P.C.

(57) ABSTRACT

Methods, systems, and apparatus, including computer programs encoded on computer storage media for learning pronunciations from acoustic sequences. One method includes receiving an acoustic sequence, the acoustic sequence representing an utterance, and the acoustic sequence comprising a sequence of multiple frames of acoustic data at each of a plurality of time steps; stacking one or more frames of acoustic data to generate a sequence of modified frames of acoustic data; processing the sequence of modified frames of acoustic data through an acoustic modeling neural network comprising one or more recurrent neural network (RNN) layers and a final CTC output layer to generate a neural network output, wherein processing the sequence of modified frames of acoustic data comprises: subsampling the modified frames of acoustic data; and processing each subsampled modified frame of acoustic data through the acoustic modeling neural network.

20 Claims, 4 Drawing Sheets

(51) Int. Cl.
*G10L 15/14* (2006.01)
*G10L 13/00* (2006.01)
*G10L 17/14* (2013.01)
*G10L 15/02* (2006.01)
*G10L 15/16* (2006.01)

(58) Field of Classification Search
CPC ..... G10L 15/144; G10L 17/04; G10L 15/065; G10L 15/083; G10L 15/14; G10L 15/142; G10L 15/16; G10L 17/16; G10L 15/148; G10L 17/06; G10L 17/14
See application file for complete search history.

(56) References Cited

U.S. PATENT DOCUMENTS

| | | | | |
|---|---|---|---|---|
| 5,809,462 | A * | 9/1998 | Nussbaum | G10L 15/063 704/232 |
| 5,864,803 | A * | 1/1999 | Nussbaum | G10L 15/063 704/231 |
| 5,867,816 | A * | 2/1999 | Nussbaum | G10L 15/063 704/231 |
| 8,126,710 | B2 * | 2/2012 | Gemello | G10L 15/16 704/202 |
| 2012/0065976 | A1 * | 3/2012 | Deng | G10L 15/14 704/256.1 |
| 2014/0257805 | A1 * | 9/2014 | Huang | G10L 15/063 704/232 |

OTHER PUBLICATIONS

F. Eyben, M. Wöllmer, B. Schuller and A. Graves, "From speech to letters—using a novel neural network architecture for grapheme based ASR," 2009 IEEE Workshop on Automatic Speech Recognition & Understanding, Merano, 2009, pp. 376-380.*

Graves et al., "Connectionist Temporal Classification: Labelling Unsegmented Sequence Data with Recurrent Neural Networks," Proceedings of the 23$^{rd}$ International Conference on Machine Learning, 2006, 8 pages.

Mohri et al., "Speech recognition with weighted finite-state transducers," Springer Handbook of Speech Processing, Springer Berlin Heidelberg 2008, pp. 559-584.

Sak et al., "Fast and Accurate Recurrent Neural Network Acoustic Models for Speech Recognition," ararXiv:1507.06947v1 [cs.CL], Jul. 2015, 5 pages.

Sak et al., "Learning acoustic frame labeling for speech recognition with recurrent neural networks," in IEEE International Conference on Acoustics, Speech, and Signal Processing (ICASSP), 2015, pp. 4280-4284.

Sak et al., "Long Short-Term Memory Based Recurrent Neural Network Architectures for Large Vocabulary Speech Recognition," arXiv:1402.1128v1 [cs.NE], Feb. 2014, 5 pages.

* cited by examiner

SPEECH RECOGNITION WITH ACOUSTIC MODELS

CROSS-REFERENCE TO RELATED APPLICATION

This application claims priority to U.S. Provisional Application No. 62/182,385, filed on Jun. 19, 2015. The disclosure of the prior application is considered part of and is incorporated by reference in the disclosure of this application.

BACKGROUND

This specification relates to acoustic modeling systems provided by neural networks.

Acoustic modeling systems receive an acoustic sequence and generate a phoneme representation of the acoustic sequence. The acoustic sequence for a given utterance includes a sequence of multiple frames of acoustic data at each of a set of time steps. The phoneme representation is a sequence of phonemes or phoneme subdivisions that the acoustic modeling system has classified as representing the received acoustic sequence. An acoustic modeling system can be used in, for example, a speech recognition system, e.g., in conjunction with a pronunciation modeling system and a language modeling system.

SUMMARY

In general, one innovative aspect of the subject matter described in this specification can be embodied in methods that include the actions of receiving an acoustic sequence, the acoustic sequence representing an utterance, and the acoustic sequence comprising a sequence of multiple frames of acoustic data at each of a plurality of time steps; stacking one or more frames of acoustic data to generate a sequence of modified frames of acoustic data; processing the sequence of modified frames of acoustic data through an acoustic modeling neural network comprising one or more recurrent neural network (RNN) layers and a final CTC output layer to generate a neural network output, wherein processing the sequence of modified frames of acoustic data comprises subsampling the modified frames of acoustic data; and processing each subsampled modified frame of acoustic data through the acoustic modeling neural network.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the generated neural network output comprises a set of scores for each subsampled modified frame of acoustic data, the set of scores for each subsampled modified frame of acoustic data comprising (i) a respective score for each of a plurality of vocabulary phonemes and (ii) a score for a blank character, the score for each vocabulary phoneme representing a respective likelihood that the vocabulary phoneme represents the utterance at the subsampled modified frame of acoustic data and the score for the blank character representing a likelihood that the utterance at the subsampled modified frame of acoustic data is incomplete.

In some implementations the method comprises for each subsampled modified frame: providing an output derived from the neural network output for the subsampled modified frame to a decoder for speech decoding of the utterance.

In some cases providing the output derived from the neural network output comprises scaling the blank character score for the subsampled modified frame, wherein scaling the blank character score comprises adding a negative logarithm of a constant scalar to the blank character score.

In some implementations the method comprises for each subsampled modified frame: determining whether the score for the blank character for the subsampled modified frame exceeds a threshold value; when the score for the subsampled modified frame does not exceed the threshold value, providing an output derived from the neural network output for the subsampled modified frame to a decoder for use in speech decoding of the utterance, and when the score for the subsampled modified frame exceeds the threshold value, causing the decoder to skip the subsampled modified frame when speech decoding the utterance.

In some cases the method comprises for each subsampled modified frame: determining whether the score for the blank character for the subsampled modified frame exceeds a threshold value; when the score for the subsampled modified frame does not exceed the threshold value, providing an output derived from the neural network output for the subsampled modified frame to a decoder for use in speech decoding of the utterance, and when the score for the subsampled modified frame exceeds the threshold value, causing the decoder to transition into a blank state instead of using the output derived from the neural network output for the subsampled modified frame in speech decoding of the utterance.

In some implementations the blank state is a state of the decoder that predicts with certainty that the utterance represented by the subsampled modified frame of acoustic data is incomplete.

In some implementations the method comprises for each subsampled modified frame: when the score for the subsampled modified frame exceeds the threshold value and when the decoder is already in the blank state, causing the decoder to skip the subsampled modified frame when speech decoding the utterance.

In some cases stacking one or more frames of acoustic data to generate a sequence of modified frames of acoustic data comprises sequentially concatenating pluralities of frames of acoustic data to generate one or more modified frames of acoustic data.

In other cases the sequence of modified frames of acoustic data is shorter than the sequence of frames of acoustic data.

In further cases subsampling the modified frames of acoustic data comprises decimating one or more frames of acoustic data.

In some implementations the neural network is trained for speech decoding using state-level minimum Bayes risk (sMBR) sequence discriminative training criterion.

In some implementations the RNN layers are Long Short-Term Memory (LSTM) neural network layers.

The subject matter described in this specification can be implemented in particular embodiments so as to realize one or more of the following advantages. By reducing the number of input frames to the neural network—through subsampling the input frames—an acoustic modeling system can achieve improved performance in terms of computation time and required computational resources compared to other acoustic modeling systems. Furthermore, by stacking, or concatenating, the input frames prior to subsampling, such that the neural network sees multiple frames at a time, the acoustic modeling system may process the complete input signal whilst preserving the full acoustic information of the input signal. In particular, for neural networks of fixed sizes, an acoustic modeling system implementing longer-term feature representations and low frame rate processing may achieve a dramatic reduction in the acoustic model computation and decoding time.

An acoustic modeling system trained using frame stacking and reduced frame rates may result in an acoustic model that achieves higher classification accuracy and recognition accuracy. In some cases, an acoustic modeling system trained using frame stacking and reduced frame rates may achieve high accuracy on medium vocabulary speech recognition without requiring the use of a language model. In addition, an acoustic modeling system trained using frame stacking and reduced frame rates may achieve improved speech recognition speed and lower latency.

By employing the probability of a blank label in speech decoding, for example by using the probability of a blank label to skip frames from decoding or to detect end of speech, an acoustic modeling system may achieve an improved speech recognition speed with higher speech recognition accuracy than other acoustic modeling systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
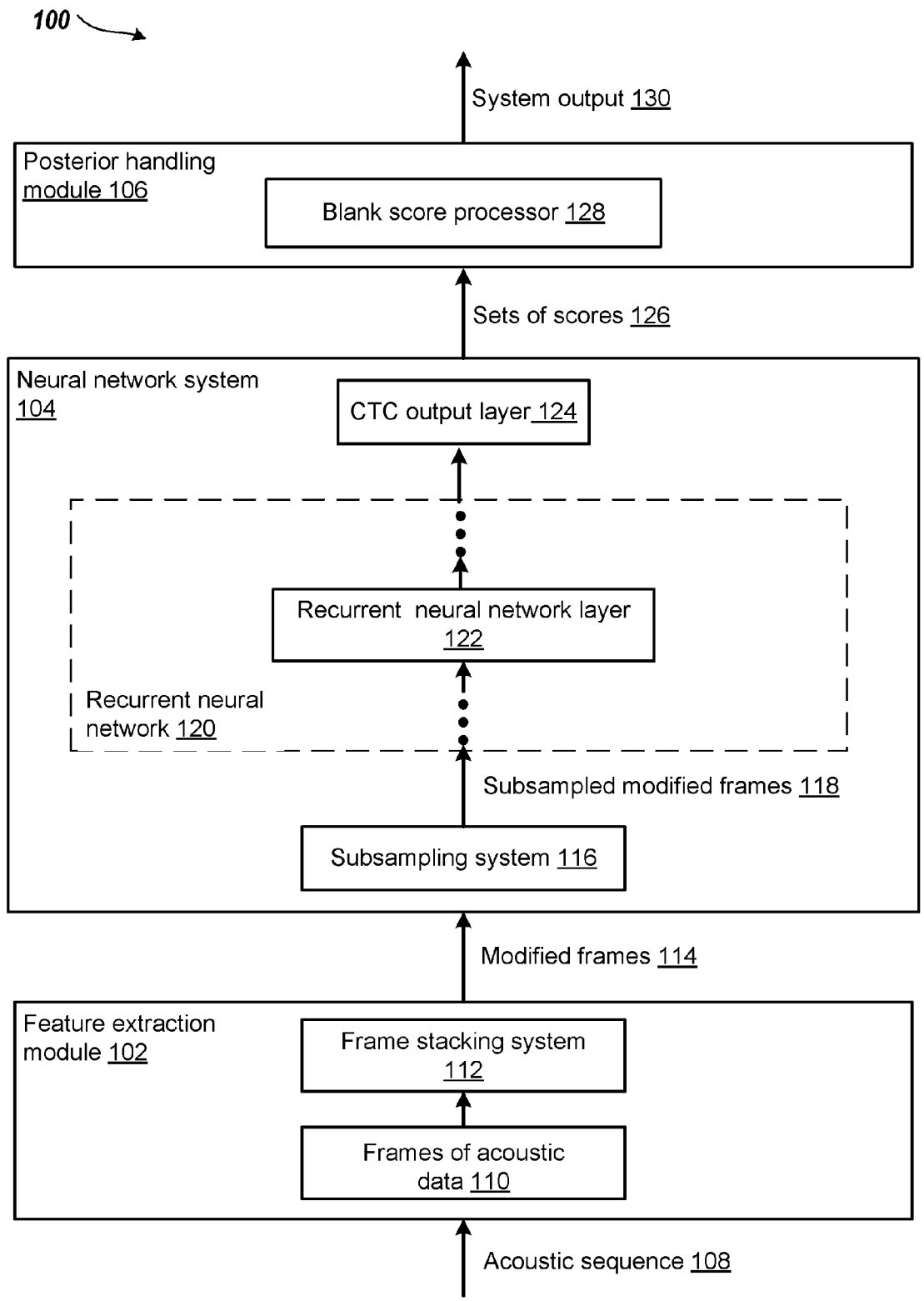
FIG. 1 shows an example acoustic modeling system.

FIG. 1 shows an example acoustic modeling system 100. The acoustic modeling system 100 includes a feature extraction module 102, a neural network system 104 and a posterior handling module 106. The acoustic modeling system 100 is an example of a system implemented as computer programs on one or more computers in one or more locations, in which the systems, components and techniques described below can be implemented. The acoustic modeling system 100 receives system inputs and generates system outputs from the system inputs. For example, the system 100 can receive an acoustic sequence 108, generate a corresponding set of modified frames of acoustic data 114, generate a corresponding set of scores 126, and generate a corresponding system output 130. In some implementations the system output 130 may be provided to a speech decoder for speech decoding. A speech decoder may receive a system output, e.g., a set of phoneme scores for the system input, generate a phoneme representation of the system input using the set of phoneme scores, and generate a corresponding written transcription of the phoneme representation. An example of performing speech recognition with finite-state transducers is described in more detail in "Speech recognition with weighted finite-state transducers," Mohri Mehryar, Fernando Pereira, and Michael Riley, *Springer Handbook of Speech Processing, Springer Berlin Heidelberg* 2008, 559-584.

The feature extraction module 102 receives an acoustic sequence and generates a feature representation for frames of acoustic data 110 in the acoustic sequence, e.g., from an audio waveform. For example, the acoustic modeling system 100 may receive a digital representation of an utterance, e.g., as a continuous stream of data, and split the stream into a sequence of multiple frames of data 110 corresponding to a set of time steps, e.g., where each frame is associated with 10 milliseconds of audio stream data. The feature extraction module 102 may analyze each of the frames 110 to determine feature values for the frames and generate corresponding acoustic feature representations. For example, the feature extraction module 102 may determine feature values for the frames and place the features' values in feature representation vectors which can be stacked, e.g., using left and right context of adjacent feature vectors, to create a larger feature representation vector that characterizes the utterance at the corresponding time step.

The feature extraction module 102 includes a frame stacking system 112. The frame stacking system 112 accesses the generated sequence of frames of acoustic data 110 and stacks multiple frames of the acoustic data to generate a sequence of modified frames of data 114. For example, each of the frames of acoustic data 110 may be associated with a given time duration of audio stream input data, e.g., 10 milliseconds. The frame stacking system 112 may sequentially concatenate multiple frames of acoustic data and generate a set of modified frames of data that are each associated with a longer time duration of the audio stream input data, e.g., 80 milliseconds. The sequence of modified frames of acoustic data 114 is shorter than the sequence of frames of acoustic data 110.

The neural network system 104 includes a subsampling system 116, a recurrent neural network 120 and a CTC output layer 124. The neural network system is trained to process modified frames of acoustic data 114 and generate respective sets of phoneme scores 126.

The subsampling system 116 down-samples the received modified frames of acoustic data in the sequence of modified frames of acoustic data 114 and provides a sequence of subsampled frames of acoustic data 118 as input to the recurrent neural network 120. For example, the subsampling system 116 may decimate one or more of the modified frames of data 114, i.e., remove or delete one or more modified frames of data 114, and provide the decimated modified frames of data 114 as input to the recurrent neural network 120. For example, the subsampling system 116 may provide every third modified frame of acoustic data 114 to the recurrent neural network 120 as input for processing.

The recurrent neural network 120 includes one or more recurrent neural network layers, e.g., neural network layer 122. Although only a single recurrent neural network layer 122 is shown in FIG. 1 for clarity, in some implementations the neural network 104 includes multiple recurrent neural network layers arranged in a sequence from a lowest recurrent layer to a highest recurrent layer. At each time step, each recurrent neural network layer receives an input from the preceding recurrent neural network layer, or, if the recurrent neural network layer is the lowest layer in the sequence of recurrent neural network layers, from the subsampling system 116, and generates a layer output for the time step.

The recurrent neural network layers can include one or more Long Short-Term Memory (LSTM) neural network layers. An LSTM neural network layer is a neural network layer that has one or more LSTM memory blocks. An example LSTM neural network that can be used to process acoustic features is described in more detail in "Long Short-Term Memory Based Recurrent Neural Network Architectures for Large Vocabulary Speech Recognition," Haşim Sak, Andrew Senior, Françoise Beaufays, http://arxiv.org/abs/1402.1128.

The recurrent neural network 120 processes each of the subsampled modified frames of acoustic data using the recurrent neural network layers to generate a respective recurrent output for each subsampled modified frame.

The neural network system 104 further includes a connectionist temporal classification (CTC) output layer 124. The CTC output layer 124 receives each recurrent output generated by the recurrent neural network 120 and generates a respective layer output from the recurrent output. For example, the CTC output layer 124 may be a softmax classifier layer that processes each recurrent output to generate a set of phoneme scores 126. Each phoneme score corresponds to a respective phoneme from a set of phonemes. When modeling context-dependent phonemes, the CTC output layer may generate a set of phoneme scores for context-dependent phonemes.

The set of phonemes includes a set of vocabulary phonemes and a blank phoneme. The set of vocabulary phonemes are a set of phonemes that may be possible phoneme representations of utterances, and do not include the blank phoneme. The score for a given vocabulary phoneme represents a likelihood that the corresponding phoneme represents the received acoustic feature representation. The score for the blank phoneme represents a likelihood that none of the phonemes in the vocabulary accurately represent the acoustic feature representation or that the acoustic feature representation at the time step is incomplete. An example CTC layer is described in more detail in "Connectionist Temporal Classification: Labelling Unsegmented Sequence Data with Recurrent Neural Networks," Alex Graves, Santiago Fernandez, Faustino Gomez, and Jurgen Schmidhuber, *Proceedings of the 23$^{rd}$ International Conference on Machine Learning*, 2006.

The neural network system 104 can be trained on multiple batches of training examples in order to determine trained values of parameters of the neural network layers, i.e., to adjust the values of parameters from initial values to trained values. For example, during the training, the neural network system 104 can process a batch of training examples and generate a respective neural network output for each training example in the batch. The neural network outputs can then be used to adjust the values of the parameters of the components of the neural network 104, for example, using state-level minimum Bayes risk (sMBR) sequence discriminative training criterion.

The posterior handling module 106 processes the sets of phoneme scores 126 received from the neural network 106 and generates a corresponding system output 130. In some implementations, the generated system output 130 may be provided to a speech decoder for speech decoding.

The posterior handling module 106 includes a blank score processor 128. The blank score processor 128 processes each of the blank scores included in the received sets of phoneme scores 126. The blank score processor 128 scales each of the blank scores before providing the sets of phoneme scores 126 as a system output 130 to a speech decoder. For example, the blank score processor may scale each blank score by adding a predetermined constant to each blank score.

The blank score processor 128 may determine whether each of the received blank scores exceed a predetermined threshold. When a received blank score does not exceed the predetermined threshold, the posterior handling module provides the blank score together with the vocabulary phoneme scores as system output to the speech decoder. In some implementations, when a received blank score exceeds the predetermined threshold, the posterior handling module provides a system output 130 to the speech decoder that causes the speech decoder to skip the respective subsampled modified frame of acoustic data when decoding the speech utterance. In other implementations, when a received blank score exceeds the predetermined threshold, the posterior handling module provides a system output 130 to the speech decoder that causes the speech decoder to transition into a blank state, i.e., a state of the decoder that predicts with certainty that the utterance represented by the subsampled modified frame of acoustic data is incomplete, instead of using the output derived from the neural network output for the subsampled modified frame of acoustic data in speech decoding of the utterance. By transitioning into a blank state, the decoder does not hypothesize any phoneme sequence—the decoder effectively skips a number of acoustic frames until it outputs another phoneme with high probability. If the decoder is already in the blank state, the output generated from the posterior handling module may cause the decoder to skip the subsampled modified frame of acoustic data when speech decoding the utterance.

In some implementations, the system may not include one or more of the frame stacking system 112, the subsampling system 116 or the blank score processor 128. For example, the subsampling system may subsample frames of acoustic data 110, i.e., frames of acoustic data that have not been stacked or modified. In other examples, the neural network system 104 may process stacked, or modified, frames of acoustic data 114, i.e., modified frames of acoustic data that have not been subsampled. In further examples, the generated system output 130 may not include a modified blank character phoneme score, i.e., a blank character phoneme score that has been processed by a blank score processor 128.

Figure 2:
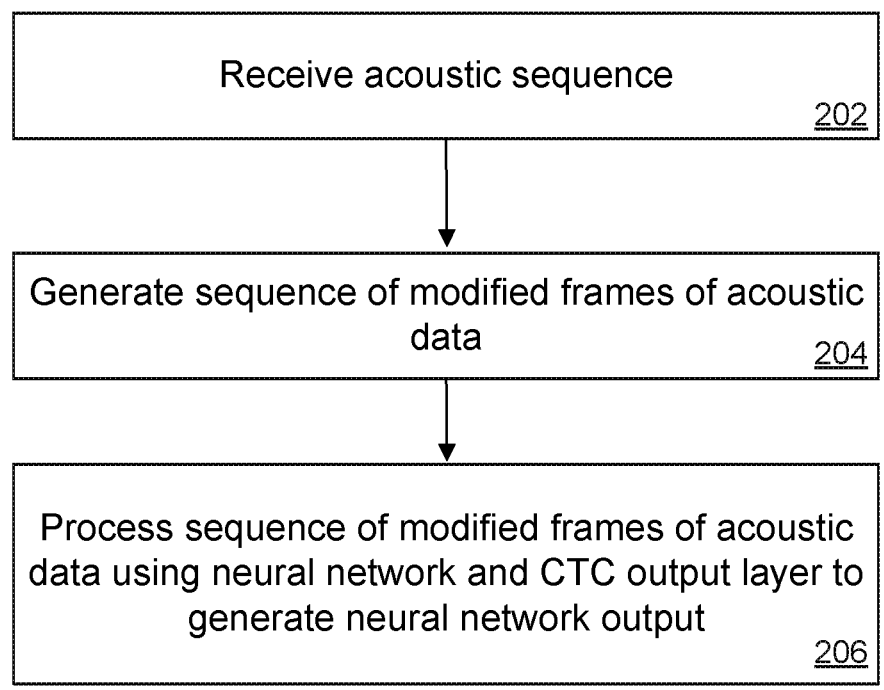
FIG. 2 is a flow diagram of an example process for processing an acoustic sequence.

FIG. 2 is a flow diagram of an example process 200 for processing an acoustic sequence. For convenience, the process 200 will be described as being performed by a system of one or more computers located in one or more locations. For example, an acoustic modeling system, e.g., the acoustic modeling system 100 of FIG. 1, appropriately programmed, can perform the process 200.

The system receives an acoustic sequence (step 202). The acoustic sequence includes a sequence of frames of acoustic data that represents an utterance. The sequence of frames of acoustic data includes a respective frame of acoustic data for each of a set of time steps. Each frame of acoustic data is an acoustic feature representation of the utterance at the corresponding time step.

The system generates a sequence of modified frames of acoustic data (step 204) using the sequence of frames of acoustic data. For example, the system may use an appropriately configured subsystem, e.g., the frame stacking system 112 of FIG. 1, to sequentially stack one or more frames of acoustic data to generate a sequence of modified, "superframes" of acoustic data. The system may stack one or more frames of acoustic data by sequentially concatenating one or more frames of acoustic data. The sequence of modified frames of acoustic data may be shorter than the sequence of frames of acoustic data, since each modified frame of acoustic data is a longer-term acoustic feature representation of the utterance than each frame of acoustic data described in step 202.

The system processes the sequence of modified frames of acoustic data using a neural network with a CTC output layer to generate a neural network output (step 206). For example, the system may process the sequence of modified frames of acoustic data using an acoustic modeling neural network system, e.g., the neural network system 104 of FIG. 1, to generate a neural network output. The generated neural network output may include a set of scores for each processed modified frame of acoustic data. The set of scores for each processed modified frame of acoustic data includes a respective score for each of a plurality of vocabulary phonemes and a respective score for a blank character phoneme. The score for each vocabulary phoneme represents a respective likelihood that the vocabulary phoneme represents the utterance at the frame of acoustic data, and the score for the blank character phoneme represents a likelihood that the utterance at the frame of acoustic data is incomplete. Processing a sequence of modified frames of acoustic data using a neural network to generate a neural network output is described in more detail below with reference to FIG. 3.

Figure 3:
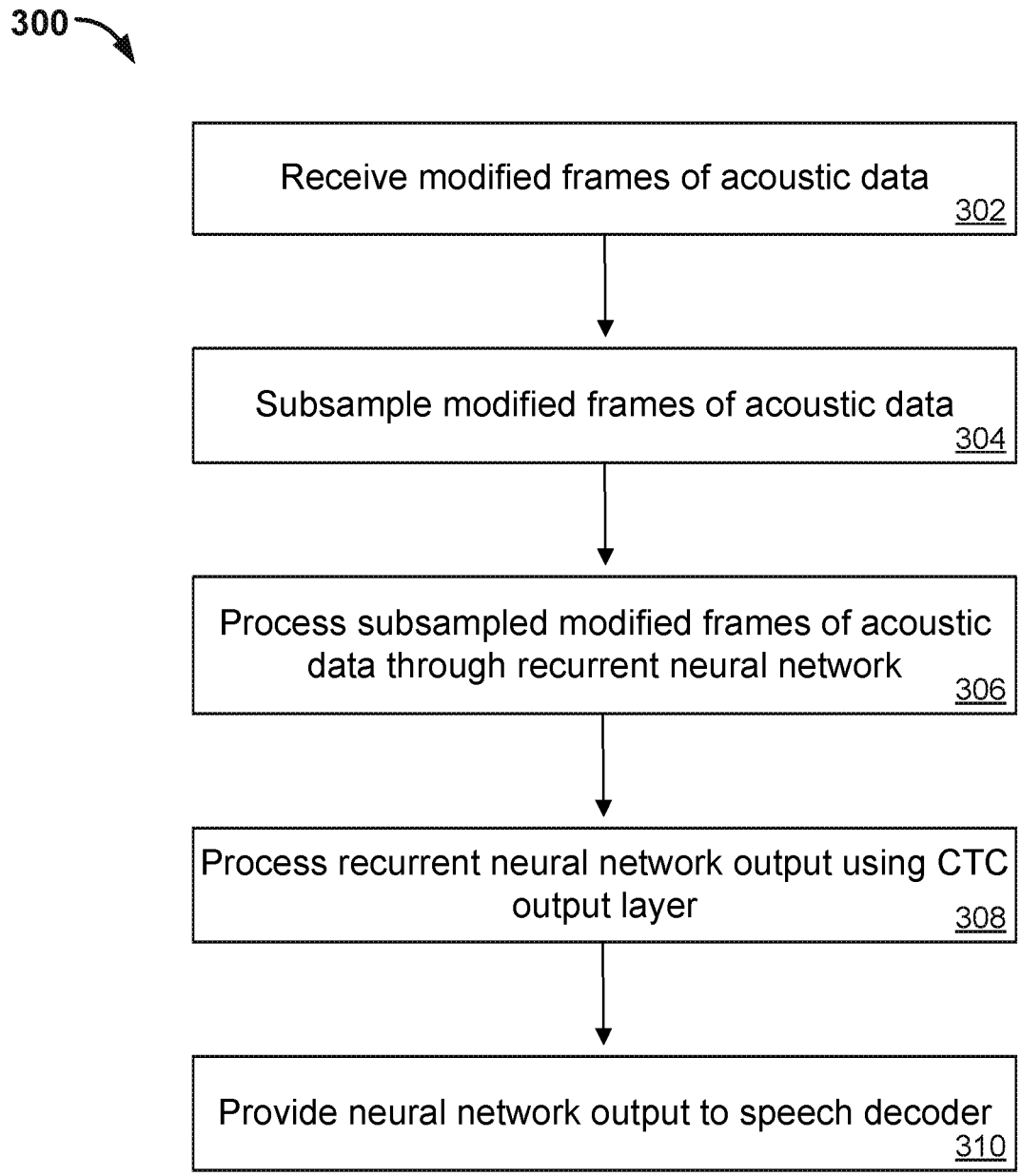
FIG. 3 is a flow diagram of an example process for processing a sequence of modified frames of acoustic data through a neural network to generate a neural network output.

FIG. 3 is a flow diagram of an example process 300 for processing a sequence of modified frames of acoustic data using a neural network to generate a neural network output. For convenience, the process 300 will be described as being performed by a system of one or more computers located in one or more locations. For example, a neural network system, e.g., the neural network system 104 of FIG. 1, appropriately programmed, can perform the process 300.

The system receives a sequence of modified frames of acoustic data (step 302). Each modified frame of acoustic data in the sequence of modified frames of acoustic data may include one or more sequentially concatenated frames of acoustic data, as described above in step 204 of FIG. 2, where each frame of acoustic data is an acoustic feature representation of an utterance at a corresponding time step.

The system subsamples the sequence of modified frames of acoustic data (step 304) and generates a sequence of subsampled modified frames of acoustic data. For example, the system may use an appropriately configured subsystem, e.g., the subsampling system 116 of FIG. 1, to downsample the sequence of modified frames of acoustic data and generate a sequence of subsampled modified frames of acoustic data. The system may subsample the sequence of modified frames of acoustic data by decimating, i.e., deleting, one or more of the received modified frames of acoustic data.

The system processes the sequence of subsampled modified frames of acoustic data using a recurrent neural network, e.g., recurrent neural network 120 of FIG. 1 to generate a sequence of corresponding recurrent neural network outputs (306). Since the input to the recurrent neural network includes a sequence of subsampled modified frames of acoustic data, the recurrent neural network is able to process the input at a lower frame rate than if the input to the recurrent neural network included the sequence of modified frames of acoustic data. By modifying and subsampling the frames of acoustic data as described above in step 204 with reference to FIG. 2 and step 304, respectively, the neural network is able to process the full input signal, i.e., the full acoustic sequence received in step 202 of FIG. 2 above, whilst reducing the number of neural network input frames and therefore reducing the neural network computation time.

The system processes the generated sequence of recurrent neural network outputs using a CTC output layer, e.g., CTC output layer 124 of FIG. 1, to generate a sequence of neural network outputs (step 308).

The system provides the sequence of neural network outputs to a speech decoder for speech decoding (step 310). The sequence of neural network outputs includes a set of scores for each neural network output in the sequence of neural network outputs. As described above in step 206 of FIG. 2, each set of scores includes a respective score for each of a plurality of vocabulary phonemes and a respective score for a blank character phoneme. The system may scale each blank character phoneme score in the set of scores for each neural network output in the sequence of neural network outputs before providing the neural network outputs to the speech decoder. For example, the system may use an appropriately configured subsystem, e.g., the blank score processor 128 of FIG. 1, to scale each blank character phoneme score. In some implementations the system may scale each blank character phoneme by adding a negative logarithm of a constant scalar to the blank character phoneme score. Providing a neural network output to a speech decoder for speech decoding is described in more detail below with reference to FIGS. 4A and 4B.

Figure 4A:
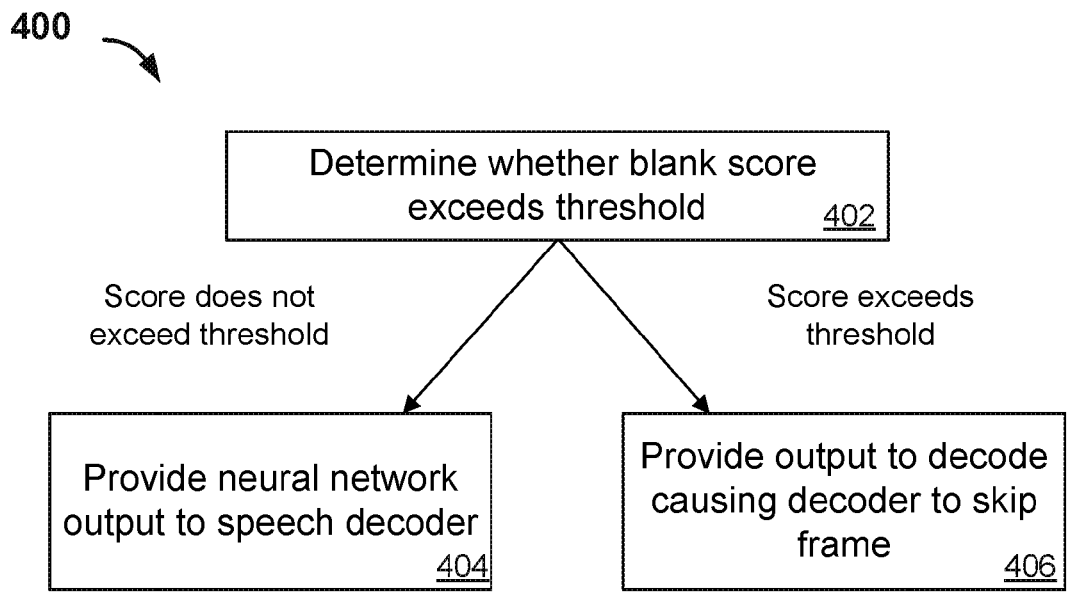
FIGS. 4A and 4B are flow diagrams of example processes for providing a neural network output to a speech decoder for speech decoding.
Figure 4B:
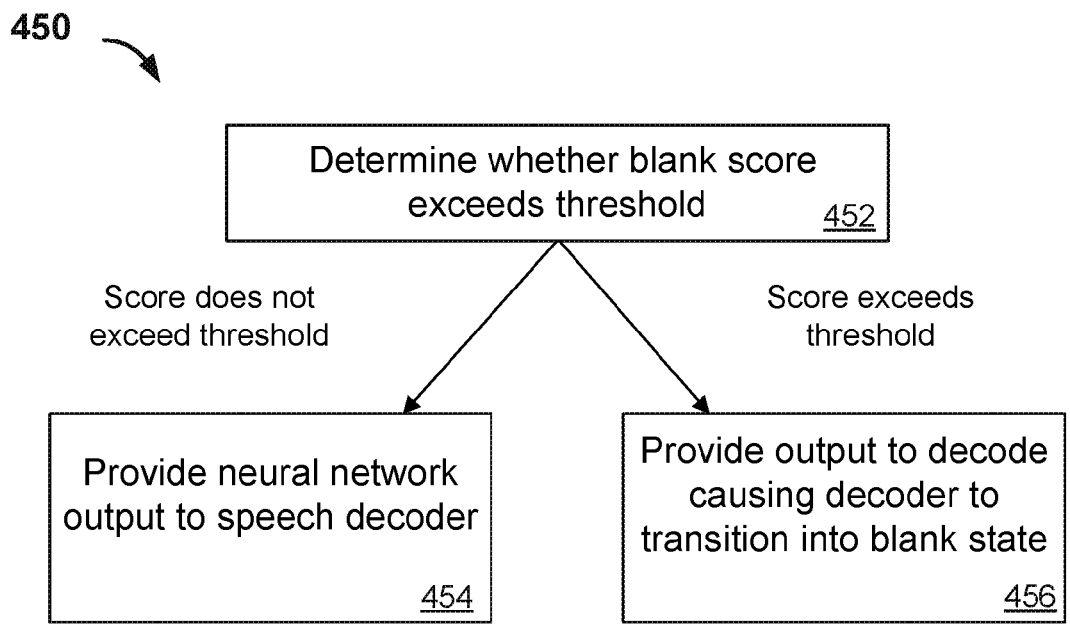

FIGS. 4A and 4B are flow diagrams of example processes 400 and 450, respectively, for providing a neural network output included in a sequence of neural network outputs to a speech decoder for speech decoding. For convenience, the processes 400 and 450 will be described as being performed by a system of one or more computers located in one or more locations. For example, an acoustic modeling system, e.g., the acoustic modeling system 100 of FIG. 1, appropriately programmed, can perform the processes 400 and 450.

As described with reference to FIG. 4A, the system determines whether the blank score included in the neural network output exceeds a predetermined threshold (step 402). For example, the system may use an appropriately configured subsystem, e.g., the blank score processor 128 of FIG. 1, to determine whether the blank score included in the neural network output exceeds the predetermined threshold.

When it is determined that the blank score included in the neural network output does not exceed the predetermined threshold, the system provides the corresponding neural network output, e.g., the blank character phoneme score and the set of vocabulary phoneme scores, to the speech decoder for speech decoding (step 404). Optionally, the system may scale the blank character phoneme score before providing the corresponding neural network output to the speech decoder for speech decoding, as described above in FIG. 3.

When it is determined that the blank score included in the neural network output does exceed the predetermined threshold, the system causes the decoder to skip the corresponding frame of acoustic data when speech decoding the sequence of neural network outputs (step 406).

As described with reference to FIG. 4B, the system determines whether the blank score included in the neural network output exceeds a predetermined threshold (step 452). For example, the system may use an appropriately configured subsystem, e.g., the blank score processor 128 of FIG. 1, to determine whether the blank score included in the neural network output exceeds the predetermined threshold.

When it is determined that the blank score included in the neural network output does not exceed the predetermined threshold, the system provides the corresponding neural network output, e.g., the blank character phoneme score and the set of vocabulary phoneme scores, to the speech decoder for speech decoding (step 454). Optionally, the system may scale the blank character phoneme score before providing the corresponding neural network output to the speech decoder for speech decoding, as described above in FIG. 3.

When it is determined that the blank score included in the neural network output does exceed the predetermined threshold, the system causes the decoder to transition into a blank state instead of using the neural network output when speech decoding the sequence of neural network outputs (step 456). The blank state of the decoder is a state of the decoder that predicts with certainty that the utterance represented by the neural network output is incomplete. In some implementations, the decoder may already be in the blank state upon determining that the blank score included in the neural network output does exceed the predetermined threshold, e.g., because the blank score included in the preceding neural network output in the sequence also exceeded the predetermined threshold. In such cases, the system causes the decoder to skip the neural network output when speech decoding the sequence of neural network outputs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more computers, an acoustic sequence, the acoustic sequence representing an utterance, and the acoustic sequence comprising a sequence of multiple frames of acoustic data at each of a plurality of time steps;
   stacking, by the one or more computers, one or more frames of acoustic data to generate a sequence of modified frames of acoustic data;
   subsampling, by the one or more computers, the sequence of modified frames of acoustic data to generate a sequence of subsampled modified frames by removing one or more modified frames from the sequence of modified frames; and
   processing, by the one or more computers, the sequence of subsampled modified frames of acoustic data through an acoustic modeling neural network comprising one or more recurrent neural network (RNN) layers and a final connectionist temporal classification (CTC) output layer, wherein the acoustic modeling neural network is configured to, for each subsampled modified frame:
      process the subsampled modified frame through the one or more RNN layers to generate a recurrent output, and
      process the recurrent output through the final CTC output layer to generate a set of scores for the subsampled modified frame, the set of scores for the subsampled modified frame comprising (i) a respective score for each of a plurality of vocabulary phonemes and (ii) a score for a blank character, the score for each vocabulary phoneme representing a respective likelihood that the vocabulary phoneme represents the utterance at the subsampled modified frame and the score for the blank character representing a likelihood that the utterance at the subsampled modified frame is incomplete.

2. The method of claim 1, further comprising, for each subsampled modified frame:
   providing an output derived from the neural network output for the subsampled modified frame to a decoder for speech decoding of the utterance.

3. The method of claim 2, wherein providing the output derived from the neural network output comprises scaling the blank character score for the subsampled modified frame, wherein scaling the blank character score comprises adding a negative logarithm of a constant scalar to the blank character score.

4. The method of claim 1, further comprising, for each subsampled modified frame:
   determining whether the score for the blank character for the subsampled modified frame exceeds a threshold value;
   when the score for the subsampled modified frame does not exceed the threshold value, providing an output derived from the neural network output for the subsampled modified frame to a decoder for use in speech decoding of the utterance, and
   when the score for the subsampled modified frame exceeds the threshold value, causing the decoder to skip the subsampled modified frame when speech decoding the utterance.

5. The method of claim 1, further comprising, for each subsampled modified frame:
determining whether the score for the blank character for the subsampled modified frame exceeds a threshold value;
when the score for the subsampled modified frame does not exceed the threshold value, providing an output derived from the neural network output for the subsampled modified frame to a decoder for use in speech decoding of the utterance, and
when the score for the subsampled modified frame exceeds the threshold value, causing the decoder to transition into a blank state instead of using the output derived from the neural network output for the subsampled modified frame in speech decoding of the utterance.

6. The method of claim 5, wherein the blank state is a state of the decoder that predicts with certainty that the utterance represented by the subsampled modified frame of acoustic data is incomplete.

7. The method of claim 5, further comprising, for each subsampled modified frame:
when the score for the subsampled modified frame exceeds the threshold value and when the decoder is already in the blank state, causing the decoder to skip the subsampled modified frame when speech decoding the utterance.

8. The method of claim 1, wherein stacking one or more frames of acoustic data to generate a sequence of modified frames of acoustic data comprises sequentially concatenating pluralities of frames of acoustic data to generate one or more modified frames of acoustic data.

9. The method of claim 1, wherein the sequence of modified frames of acoustic data is shorter than the sequence of frames of acoustic data.

10. The method of claim 1, wherein subsampling the modified frames of acoustic data comprises decimating one or more frames of acoustic data.

11. The method of claim 1, wherein the neural network has been trained for speech decoding using state-level minimum Bayes risk (sMBR) sequence discriminative training criterion.

12. The method of claim 1, wherein the RNN layers are Long Short-Term Memory (LSTM) neural network layers.

13. A system comprising one or more computers and one or more storage devices storing instructions that are operable, when executed by the one or more computers, to cause the one or more computers to perform operations comprising:
receiving an acoustic sequence, the acoustic sequence representing an utterance, and the acoustic sequence comprising a sequence of multiple frames of acoustic data at each of a plurality of time steps;
stacking one or more frames of acoustic data to generate a sequence of modified frames of acoustic data;
subsampling the sequence of modified frames of acoustic data to generate a sequence of subsampled modified frames by removing one or more modified frames from the sequence of modified frames; and
processing the sequence of subsampled modified frames of acoustic data through an acoustic modeling neural network comprising one or more recurrent neural network (RNN) layers and a final connectionist temporal classification (CTC) output layer, wherein the acoustic modeling neural network is configured to, for each subsampled modified frame:
process the subsampled modified frame through the one or more RNN layers to generate a recurrent output, and
process the recurrent output through the final CTC output layer to generate a set of scores for the subsampled modified frame, the set of scores for the subsampled modified frame comprising (i) a respective score for each of a plurality of vocabulary phonemes and (ii) a score for a blank character, the score for each vocabulary phoneme representing a respective likelihood that the vocabulary phoneme represents the utterance at the subsampled modified frame and the score for the blank character representing a likelihood that the utterance at the subsampled modified frame is incomplete.

14. The system of claim 13, the operations further comprising, for each subsampled modified frame:
providing an output derived from the neural network output for the subsampled modified frame to a decoder for speech decoding of the utterance.

15. The system of claim 14, wherein providing the output derived from the neural network output comprises scaling the blank character score for the subsampled modified frame, wherein scaling the blank character score comprises adding a negative logarithm of a constant scalar to the blank character score.

16. The system of claim 13, the operations further comprising, for each subsampled modified frame:
determining whether the score for the blank character for the subsampled modified frame exceeds a threshold value;
when the score for the subsampled modified frame does not exceed the threshold value, providing an output derived from the neural network output for the subsampled modified frame to a decoder for use in speech decoding of the utterance, and
when the score for the subsampled modified frame exceeds the threshold value, causing the decoder to skip the subsampled modified frame when speech decoding the utterance.

17. The system of claim 13, the operations further comprising, for each subsampled modified frame:
determining whether the score for the blank character for the subsampled modified frame exceeds a threshold value;
when the score for the subsampled modified frame does not exceed the threshold value, providing an output derived from the neural network output for the subsampled modified frame to a decoder for use in speech decoding of the utterance, and
when the score for the subsampled modified frame exceeds the threshold value, causing the decoder to transition into a blank state instead of using the output derived from the neural network output for the subsampled modified frame in speech decoding of the utterance.

18. One or more non-transitory computer-readable storage media having instructions stored thereon that are executable by one or more computers and upon such execution cause the one or more computers to perform operations comprising:
receiving an acoustic sequence, the acoustic sequence representing an utterance, and the acoustic sequence comprising a sequence of multiple frames of acoustic data at each of a plurality of time steps;
stacking one or more frames of acoustic data to generate a sequence of modified frames of acoustic data;

subsampling the sequence of modified frames of acoustic data to generate a sequence of subsampled modified frames by removing one or more modified frames from the sequence of modified frames; and processing the sequence of subsampled modified frames of acoustic data through an acoustic modeling neural network comprising one or more recurrent neural network (RNN) layers and a final connectionist temporal classification (CTC) output layer, wherein the acoustic modeling neural network is configured to, for each subsampled modified frame:

process the subsampled modified frame through the one or more RNN layers to generate a recurrent output, and process the recurrent output through the final CTC output layer to generate a set of scores for the subsampled modified frame, the set of scores for the subsampled modified comprising (i) a respective score for each of a plurality of vocabulary phonemes and (ii) a score for a blank character, the score for each vocabulary phoneme representing a respective likelihood that the vocabulary phoneme represents the utterance at the subsampled modified frame and the score for the blank character representing a likelihood that the utterance at the subsampled modified frame is incomplete.

19. The computer storage media of claim 18, the operations further comprising, for each subsampled modified frame:

providing an output derived from the neural network output for the subsampled modified frame to a decoder for speech decoding of the utterance.

20. The computer storage media of claim 18, the operations further comprising, for each subsampled modified frame:

determining whether the score for the blank character for the subsampled modified frame exceeds a threshold value;

when the score for the subsampled modified frame does not exceed the threshold value, providing an output derived from the neural network output for the subsampled modified frame to a decoder for use in speech decoding of the utterance, and when the score for the subsampled modified frame exceeds the threshold value, causing the decoder to transition into a blank state instead of using the output derived from the neural network output for the subsampled modified frame in speech decoding of the utterance.

* * * * *